(12) United States Patent
Cao et al.

(10) Patent No.: US 11,627,478 B2
(45) Date of Patent: Apr. 11, 2023

(54) VIRTUALIZED CELL ARCHITECTURE

(71) Applicant: Parallel Wireless, Inc., Nashua, NH (US)

(72) Inventors: Yang Cao, Westford, MA (US); Rajesh Kumar Mishra, Westford, MA (US)

(73) Assignee: Parallel Wireless, Inc., Nashua, NH (US)

(*) Notice: Subject to any disclaimer, the term of this patent is extended or adjusted under 35 U.S.C. 154(b) by 0 days.

(21) Appl. No.: 16/164,790

(22) Filed: Oct. 18, 2018

(65) Prior Publication Data

US 2019/0124522 A1    Apr. 25, 2019

Related U.S. Application Data

(60) Provisional application No. 62/574,152, filed on Oct. 18, 2017.

(51) Int. Cl.
*H04L 12/00* (2006.01)
*H04W 16/30* (2009.01)
(Continued)

(52) U.S. Cl.
CPC .......... *H04W 16/30* (2013.01); *H04L 5/0023* (2013.01); *H04L 5/0035* (2013.01); *H04L 5/0037* (2013.01); *H04L 5/0069* (2013.01); *H04L 5/0091* (2013.01); *H04L 67/61* (2022.05); *H04W 76/15* (2018.02); *H04L 5/0048* (2013.01); *H04L 5/0053* (2013.01); *H04L 5/14* (2013.01); *H04L 69/14* (2013.01)

(58) Field of Classification Search
None
See application file for complete search history.

(56) References Cited

U.S. PATENT DOCUMENTS 9,742,535 B2  8/2017  Lorca Hernando
2009/0207787 A1  8/2009  Sato et al.
(Continued)

FOREIGN PATENT DOCUMENTS

EP    2934033 A1    10/2015

OTHER PUBLICATIONS

Vikas Paliwal, Ioannis Lambadaris, "Cell Search Procedures in LTE Systems", Carleton University, Department of Systems and Computer Engineering, Ottawa, ON.
(Continued)

*Primary Examiner* — Ajit Patel
*Assistant Examiner* — Lionel Preval
(74) *Attorney, Agent, or Firm* — Michael Y. Saji; David W. Rouille

(57) ABSTRACT

A method for combining two radio access network (RAN) cells into a virtual cell is disclosed, comprising: at a coordinating node, assigning a virtual cell identifier for a virtual cell, assigning a plurality of base stations to the virtual cell, and scheduling resources for a user equipment (UE) at each base station in the virtual cell; and at a base station of the plurality of base stations, constructing a signal containing two cell identifiers, the two cell identifiers being the virtual cell identifier and a physical cell identifier of the base station, and sending the signal to the UE, thereby improving performance for the UE at a cell edge of the first base station and of the second base station.

15 Claims, 16 Drawing Sheets

(51) Int. Cl.
*H04L 5/00* (2006.01)
*H04W 76/15* (2018.01)
*H04L 67/61* (2022.01)
*H04L 69/14* (2022.01)
*H04L 5/14* (2006.01)

(56) References Cited

U.S. PATENT DOCUMENTS

| | | | |
|---|---|---|---|
| 2009/0270079 A1 | 10/2009 | Han et al. | |
| 2010/0210255 A1 | 8/2010 | Amirijoo et al. | |
| 2012/0008528 A1 | 1/2012 | Dunbar et al. | |
| 2013/0083744 A1 | 4/2013 | Peng et al. | |
| 2013/0163508 A1 | 6/2013 | Yu et al. | |
| 2014/0045497 A1* | 2/2014 | Abe | H04L 1/0067 |
| | | | 455/435.1 |
| 2014/0073306 A1 | 3/2014 | Shetty et al. | |
| 2014/0079009 A1* | 3/2014 | Liu | H04W 8/26 |
| | | | 370/329 |
| 2014/0161060 A1* | 6/2014 | Nam | H04L 5/0055 |
| | | | 370/329 |
| 2014/0219162 A1* | 8/2014 | Eyuboglu | H04L 27/34 |
| | | | 370/315 |
| 2014/0286283 A1* | 9/2014 | Kim | H04W 52/243 |
| | | | 370/329 |
| 2015/0155996 A1* | 6/2015 | Garcia | H04L 5/0053 |
| | | | 370/329 |
| 2015/0230220 A1 | 8/2015 | Li et al. | |
| 2015/0296390 A1 | 10/2015 | Mino Diaz et al. | |
| 2015/0296391 A1 | 10/2015 | Kotkar et al. | |
| 2016/0037420 A1* | 2/2016 | Gaal | H04W 72/042 |
| | | | 370/331 |
| 2016/0081082 A1* | 3/2016 | Cao | H04B 7/024 |
| | | | 370/329 |
| 2016/0262114 A1* | 9/2016 | Chen | H04W 52/143 |
| 2016/0277975 A1 | 9/2016 | Donepudi et al. | |
| 2017/0311177 A1* | 10/2017 | Sarkissian | H04W 16/28 |
| 2017/0347272 A1 | 11/2017 | Ahmavaara et al. | |
| 2017/0353913 A1* | 12/2017 | Sun | H04W 48/16 |
| 2018/0062708 A1* | 3/2018 | Sun | H04B 7/024 |
| 2018/0092110 A1* | 3/2018 | Malli | H04B 7/0486 |
| 2019/0289582 A1* | 9/2019 | Seo | H04L 27/2613 |
| 2019/0364611 A1 | 11/2019 | Centonza et al. | |

OTHER PUBLICATIONS

European Telecommunication Standards Institute, "LTE; Evolved Universal Terrestrial Radio Access (E-UTRA) and Evolved Universal Terrestrial Radio Access Network (E-UTRAN); Overall Description; Stage 2 (3GPP TS 36.300 Version 10.9.0 Release 10)", ETSI TS 136 300 V10.9.0 (Feb. 2013).

"Virtualizing the Cell", CommScope, Inc., EX-110192-EN, May 2016.

Steve Perlman, Antonio Forenza, "pCell Wireless Reinvented", Artemis Networks, LLC, an Introduction to pCell, White Paper, Feb. 2015.

Antonio Forenza, Stephen Perlman, Fadi Saibi, Mario Di Dio, Roger Van Der Laan, Giuseppe Caire, "Achieving Large Multiplexing Gain in Distributed Antenna Systems via Cooperation with pCell Technology", Artemis Networks, LLC, Submitted to the IEEE Asilomar Conference on Signals, Systems, and Computers, Nov. 8-11, 2015, Pacific Grove, CA, USA.

European Telecommunication Standards Institute, "LTE; Evolved Universal Terrestrial Radio Access (E-UTRA); Physics Channels and Modulation (3GPP TS 36.211 Version 13.0.0 Release 13)", ETSI TS 136 211 V13.0.0 (Jan. 2016).

European Telecommunication Standards Institute, "LTE; Evolved Universal Terrestrial Radio Access (E-UTRA); Radio Resource Control (RRC); Protocol Specification (3GPP TS 36.331 Version 13.0.0 Release 13)", ETSI TS 136 331 V13.0.0 (Jan. 2016).

Taylan Sahim, Markus Klugel, Chan Zhour, Wolfgang Kellerer, "Virtual Cells for 5G V2X Communications," in IEEE Communications Standards Magazine, vol. 2, No. 1, pp. 22-28, Mar. 2018.

Mohamed Elkourdi, Asim Mazin, Richard Gitlin, "Performance Analysis for Virtual-Cell Based CoMP 5G Networks Using Deep Recurrent Neural Nets," 2019 Wireless Telecommunications Symposium (WTS), New York City, NY, USA, 2019, pp. 1-6.

* cited by examiner

VIRTUALIZED CELL ARCHITECTURE

CROSS-REFERENCE TO RELATED APPLICATIONS

This application claims the benefit of priority under 37 C.F.R. § 119(e) to U.S. Provisional Pat. App. No. 62/574,152, titled "Virtualized Cell Architecture" and filed Oct. 18, 2017, which is also which is also hereby incorporated by reference in its entirety for all purposes. Additionally, this application hereby incorporates by reference U.S. Pat. No. 9,491,801, "Dynamic Multi-Access Wireless Network Virtualization," filed Sep. 24, 2013; U.S. Pat. App. Pub. No. 2016/0173555, "Wireless Broadband Network with Integrated Streaming Multimedia Services," filed Oct. 18, 2013; U.S. Pat. App. Pub. No. 2017/0272330, "Base Station Grouping for Topology Hiding," filed Mar. 27, 2017; U.S. Pat. App. Pub. No. 2015/0257051, "Federated X2 Gateway," filed Mar. 9, 2015, each in its entirety.

BACKGROUND

It is difficult to provide service to users who are at the cell edge and are being handed over to other cells. One way to understand the cell edge problem is as follows. Unlike 3G, in today's LTE, only hard handover (HHO) is supported. The lack of soft handover (SHO) support causes the following issues: poor Cell-edge UE performance (in contrast, this is the region macro-diversity enabled SHO provides most of its gains). Also, if the cell-edge UE is in the C-DRX state or is running delay/error-sensitive VoIP applications (VoLTE etc.), the UE will suffer the most due to the lack of SHO support (note that SHO was introduced in 3G to improve voice quality). The statistics bear this out, as VoLTE calls drop up to 4-5 times more frequently than calls over 2G or 3G, and 80% of such drops are due to mobility issues. (Source: https://www.telecomtv.com/articles/mobile/faulty-volte-dropped-calls-bring-more-bad-news-to-lte-voice-plans-13248/)

SUMMARY

A method for combining two radio access network (RAN) cells into a virtual cell is disclosed, comprising: at a coordinating node, assigning a virtual cell identifier for a virtual cell, assigning a plurality of base stations to the virtual cell, and scheduling resources for a user equipment (UE) at each base station in the virtual cell; and at a base station of the plurality of base stations, constructing a signal containing two cell identifiers, the two cell identifiers being the virtual cell identifier and a physical cell identifier of the base station, and sending the signal to the UE, thereby improving performance for the UE at a cell edge of the first base station and of the second base station.

The method may further comprise at a second base station of the plurality of base stations, constructing a second signal containing two cell identifiers, the two cell identifiers being the virtual cell identifier and a physical cell identifier of the second base station, and sending the second signal to the UE. The coordinating node may be a mesh network base station or a gateway between the plurality of base stations and a core network. The UE may be a cell edge UE having a reduced signal quality below a cell edge threshold. The plurality of base stations may be LTE eNodeBs, and The resources scheduled by the coordinating node include resource block allocations for a physical downlink shared channel (PDSCH), a physical uplink shared channel (PUSCH), a physical uplink control channel (PUCCH), and a physical downlink control channel (PDCCH). The signal may include a reference signal, a primary synchronization signal, and a secondary synchronization signal for the UE.

The method may further comprise dynamically adding or removing a base station to or from the virtual cell based on a measurement report from the UE. The method may further comprise constructing the signal with up to 5 cell identifiers. The method may further comprise reserving, at the coordinating node, a portion of a radio resource pool for cell edge users. The method may further comprise scheduling, at the base station, resources for a cell center UE. The method may further comprise constructing the virtual cell identifier not to overlap with the physical cell identifier of the base station, such that the reference signal maintains a mod-6 difference.

The method may further comprise assigning non-overlapping radio resources to different UEs. The method may further comprise using multiple-in, multiple-out (MIMO), spatial diversity, or beamforming for spatial multiplexing between the plurality of base stations and the UE. The method may further comprise sending data from more than one of the plurality of base stations in the virtual cell simultaneously to the UE. The method may further comprise assigning a single set of radio resources to two different UEs that may be being served by the virtual cell. The method may further comprise using interference rejection combining (IRC) or maximum ratio combining (MRC) to construct or reconstruct the signal.

The method may further comprise using modulated symbol multiplexing at a transmitter or modulated symbol de-multiplexing at a receiver. The method may further comprise performing management of member transmitters at different base stations as virtual MIMO antennas. The method may further comprise assigning two physical base stations to the virtual cell, to communicate with a Cat. 4 UE, or assigning four physical base stations in the virtual cell, to communicate with a Cat. 6 or Cat 7 UE.

BRIEF DESCRIPTION OF THE DRAWINGS

FIG. 8A shows downlink processing, in accordance with some embodiments.

FIG. 8B shows uplink processing, in accordance with some embodiments.

FIG. 8C shows a second case of uplink processing, with frame selection being performed at the serving cell, in accordance with some embodiments.

FIG. 8D shows downlink processing, in accordance with some embodiments.

FIG. 8E shows a third case of uplink processing, in accordance with some embodiments.

DETAILED DESCRIPTION

Figure 1:
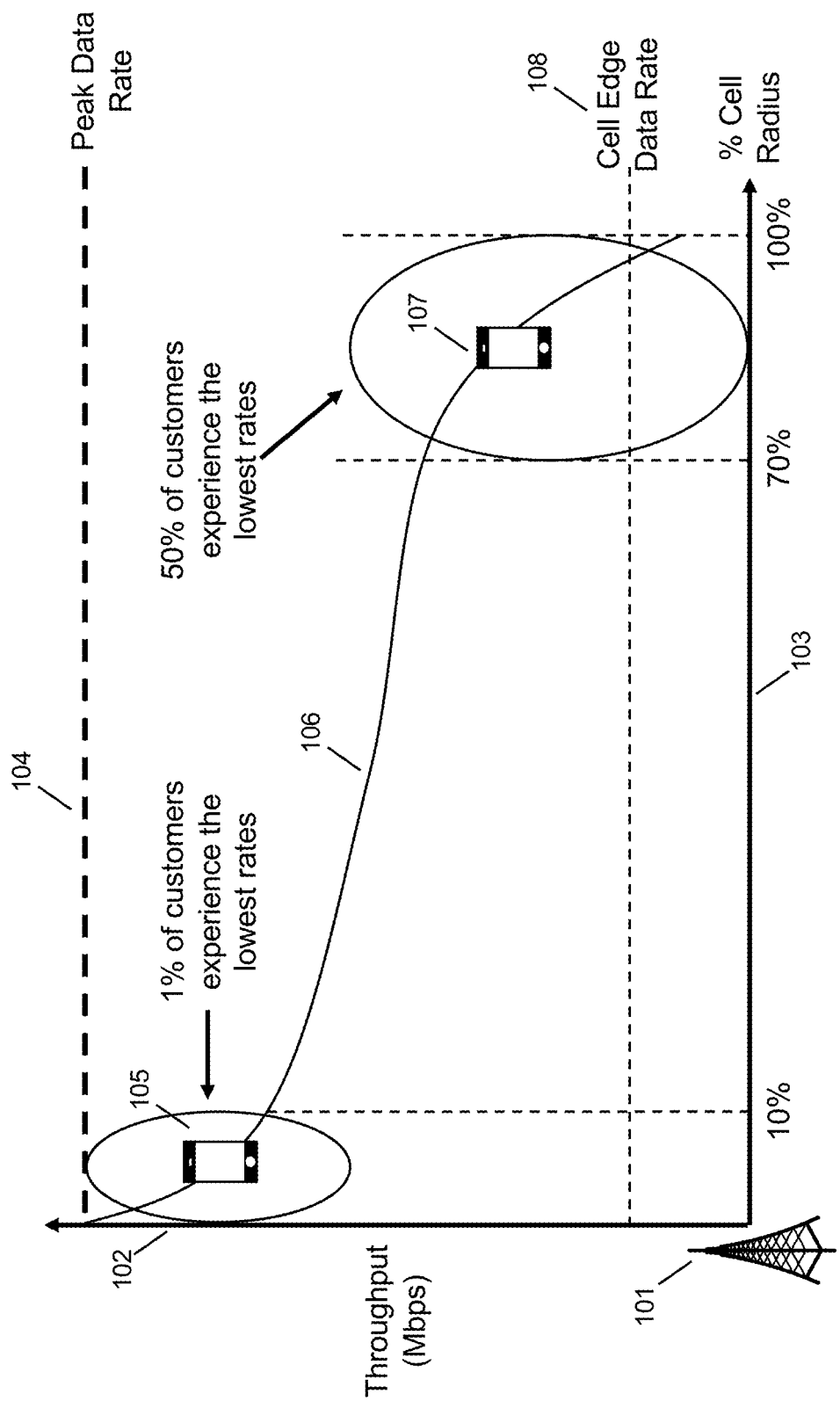
FIG. 1 shows the cell edge effect as known in the prior art.

FIG. 1 shows the cell edge effect as known in the prior art. The cell edge effect results in an imbalance of data rates as well. 1% of customers experience the highest data rates, as typically they are located within 10% of the assumed cell radius; however, from between 70% to 100% of the cell radius, data rates drop sharply. 50% of customers fall within this region and are experiencing significantly reduced data rates, as shown in FIG. 1.

Further, at the cell edge and in a mobility scenario, the following observations can be made: 1. Poor SIR renders power-control approach useless; 2. Conventional ICIC approach leads to low spectrum efficiency; 3. Due to lack of reciprocity in an FDD, DL/UL imbalance results in poor handover success rate; 4. the message completing the HO from the source base station to the target base station is particularly easily dropped since the UE is moving away from the source base station and is at its furthest from that base station; and 5. hysteresis does not solve this problem completely, and ping-ponging is challenging.

Further, the UE at the cell edge also has to dwell in a power-hungry state during the transition, hysteresis, and eventual handover. If RRC_CONNECTED consumes, for example, 1000-3500 mW, and RRC IDLE consumes <15 mW, it is clear that without macro-diversity, UEs remain in the C-DRX (continuous reception) state until all timers have expired in the handover, and need to drain excessive battery to complete HHO(s), defeating the purpose of DRX for energy saving.

The virtual cell concept has been addressed by 3GPP but only in very limited scope. So far it is only mentioned in 3GPP 36.211 R13 as the possible seed to generate DMRS. It is not even included in 36.331 (RRC) R13. A new approach to the virtual cell concept applicable in, e.g., the 4G/5G context is found herein.

The present disclosure is about not only virtualizing of RAN, but also of a rethinking at the base level. The smallest element of RAN is the cell. What if we could rethink this? In a simplified scenario: <255 systems. One HNG, and all attached cells, are a single virtual eNB. Now if we bring virtualization down to the cell level, a semantics is needed for a bunch of virtual cells. (1 eNB already can involve multiple cells, under our HNG architecture or in common parlance) (Cell=~sector). The present idea is a particular method for doing so.

A new solution is proposed to dynamically populate a personal cell cluster or virtual cell cluster for cell-edge UEs. Cell-core UEs can be served as is, in some embodiments, either from the virtual cell or from existing cell IDs. HNG can be the common anchor point for the virtual cell. Virtual cells can be set up for each individual UE. Transparent to the UE (no changes to the UE required, in some embodiments). Where the word "virtual" or "virtual cell" is used herein, it is understood that based on context it is typically used in this sense, specifically, a logical construct having as its underlying physical base stations a plurality of cells (cell cluster) that are the members of the virtual cell and that act as a single cell. The virtual cell acts as a single cell without causing the underlying physical, non-virtual cells to fail to act as their own cells, and this is enabled by careful choice of, e.g., the cell ID, control channel locations, resource allocations, etc.

This proposal is a flexible framework solution and additional features, components, aspects may be added on top-component choices can include MIMO, beamforming, modulated symbol muxing etc. The disclosed system is also suitable for interoperating with multiple RATs, so that for a UE with multiple transceivers, the UE may exploit the possibility to use any active cell (2G, 3G, 4G and/or Wi-Fi) and benefiting from heterogeneous personal cell cluster. The HNG described herein is a Parallel Wireless HetNet Gateway™, which provides heterogeneous network management and gateway capabilities sitting at the network edge between the RAN and the core network.

The use of a virtual cell ID (VCI) is proposed. This is a logical construct created by eNB or cell, communicated to UE via RRC. Create VCI which is an arbitrary number. But challenge is, RRC and UE do not support VCI. Even the latest Rel. 13 does not have VCI in the RRC. We solve this problem by using the same cell ID construction method, but to create virtual cell ID. PCI is 3×SSS plus PSS (Primary and secondary synchronization signals (PSS & SSS) in LTE). This only requires the central 62+10 RE's (resource elements) to present this information. To the UE it just looks like another cell. No difference. From physically the same antenna port, one CWS can present different PSS/SSS; and in this way, one physical CWS presents different cell IDs. UE won't perceive the difference.

72 REs=6 RB=1.4 MHz. But there are 100 resource blocks (RB) available in all. There are other RBs not used. It is possible to take the first 6 RBs to create another virtual cell. Normally you would use these RBs for data. Our scheduler needs to schedule these RBs for this special purpose.

Given unlimited baseband capability, we would have capacity for 100 carriers. Let's suppose every carrier was one of the carriers Yang was saying. We could create a virtual cell for every user, or we could just allocate RB resources to each user. What does this mean? We could use beamforming AND this enables REUSE of the same RBs to someone else. We use excess baseband capability at eNB to provide a multiplying factor. 2×2 MIMO for downlink coordinated multipoint (COMP).

Signal energy in one stream will merely appear as noise when linearly demodulating other streams. This enables multiple streams to be multiplexed, for example, for the same bandwidth to be allocated to two separate UEs, as each UE will receive a signal from the base station that is closest to it, and will treat the signal from the other base station on the same band as mere interference. Using an increased number of receive antennas at the UE also enables a correspondingly greater number of virtual cells to be used for communication with the same UE.

Use cases could include, e.g., subspectrum slicing; give to UEs based on the UE capability; give to base station based on their capability; beamforming; MIMO; selecting which antennas to point to User 1 and which antennas to point to User 2; using omni MIMO antennas versus fancy patch antenna/array antenna; one of the cells are 3G cells; perfect sync; closed user groups (only I can be there and you cannot enter my cell); 4G plus 4G multicarrier on the same device baseband; Multi-RAT. Each 1.4 MHz could be 2G, or 3G, or LTE, or Wi-Fi, or FDD or TDD (Seamlessly create a new 2G or 3G cell without reducing 4G); Reserve some portion of MHz for backhaul purpose, e.g., use 10 MHz for access and 10 MHz for other purpose; One Intel™ Xeon or other commodity hardware-based base stations can run multiple virtual machines. Each could be responsible for a virtual cell. And this ties into infrastructure-based virtualization schemes, e.g., allocate more or less memory to different virtual cells; Baseband virtualization; Resource allocation schemes; Carrier Aggregation.

What does the UE see? Literally, from direction A, there is 2 cells and direction B, 2 cells. CWS 1, cell 1: 20 MHz. CWS 2, cell 2: 20 MHz. Cell 3 (construct): 1.4 MHz. 3 different cell IDs. Cell acquisition process is the same.

Chop into multi-spectrums. There are some specific ERFCNs that are 3GPP-approved. Like Band 14. 1.4 MHz is not approved by 3GPP (and will not have UE support) but certain others could be. Normally, there are finite pointers where the UE looks for sync signal. UE scans through all spectrum, finds a control channel, zooms in on the cell sync signal, and syncs to that. We include ability to have a sliding window. We enable ability to create a new range at any point in the MHz. Note that in a normal scenario if two cells are broadcasting the same PCI the UE will not know and get confused.

Note that in this case the new cell 3 looks like a stronger signal. So handovers work normally.

In a nutshell, this approach can address VoLTE quality issue for cell-edge UEs. And this is a generalized approach, not limiting to physical constructs requiring spatial dimension (beamforming).

Virtual cell construction detail is contained on the eNB/HNG side (as the natural cell-layer virtual extension to our current HNG→virtual eNB abstraction model), completely transparent to the UE. UE can use the standard cell-search scheme as is to retrieve virtual cell, the same as physical.

Regarding how to minimize UE impact (requirement), and how to implement virtual handover (to conform to the 3GPP HO procedure as is), within this disclosure, the existing Cat-4 (R8/9/10) UE can be sufficiently used as is to realize the diversity gain. The required changes will only need to be implemented on our eNB/HNG side. The proposed scheme is a flexible framework solution—it can be constructed using elements as is; it could also be further extended involving more advanced elements like beamforming, coherent transmission etc to realize spectral efficiency gain.

Ideas relating to this virtual cell concept has been addressed by 3GPP in very limited scope. So far it is only mentioned in 3GPP 36.211 R13 as the possible seed to generate DMRS. It is not even included in 36.331 (RRC) R13.

Figure 2:
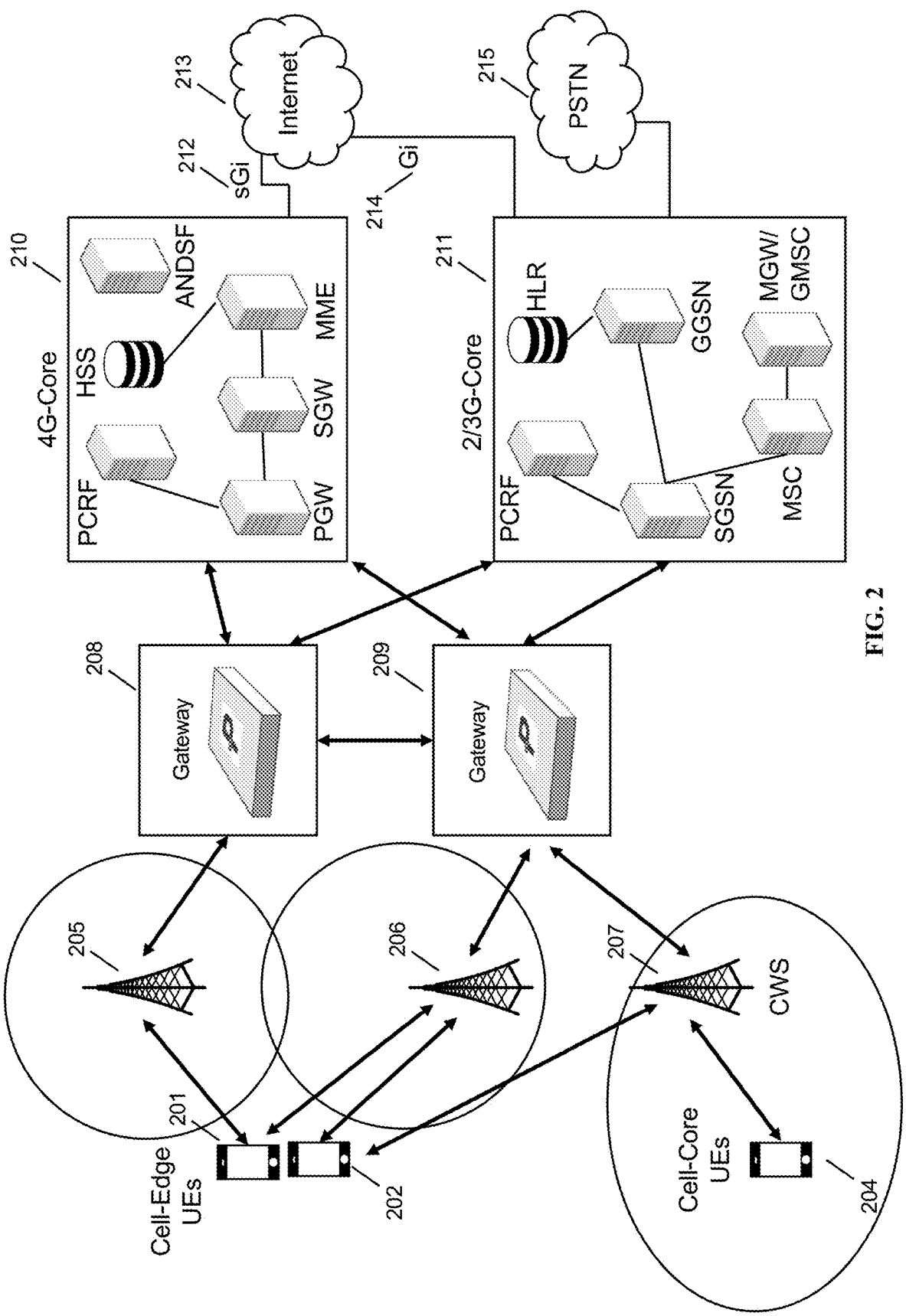
FIG. 2 depicts a prior art network architecture incorporating the Parallel Wireless HetNet Gateway™ and Parallel Wireless CWS™ heterogeneous multi-RAT base station.

FIG. 2 depicts a prior art network architecture incorporating the Parallel Wireless HetNet Gateway™ and Parallel Wireless CWS™ heterogeneous multi-RAT base station. Cell-edge and cell-core UEs are depicted. A 2G/3G core is present, as is a 4G core; details regarding how cell service can be provided in such a network architecture are further described in U.S. Pat. No. 9,491,801, "Dynamic Multi-Access Wireless Network Virtualization," filed Sep. 24, 2013; U.S. Pat. App. Pub. No. 2016/0173555, "Wireless Broadband Network with Integrated Streaming Multimedia Services," filed Oct. 18, 2013; U.S. Pat. App. Pub. No. 2017/0272330, "Base Station Grouping for Topology Hiding," filed Mar. 27, 2017; U.S. Pat. App. Pub. No. 2015/0257051, "Federated X2 Gateway," filed Mar. 9, 2015, hereby incorporated by reference, and features therein are assumed to be understood by the reader to apply to the nodes described herein.

Figure 3:
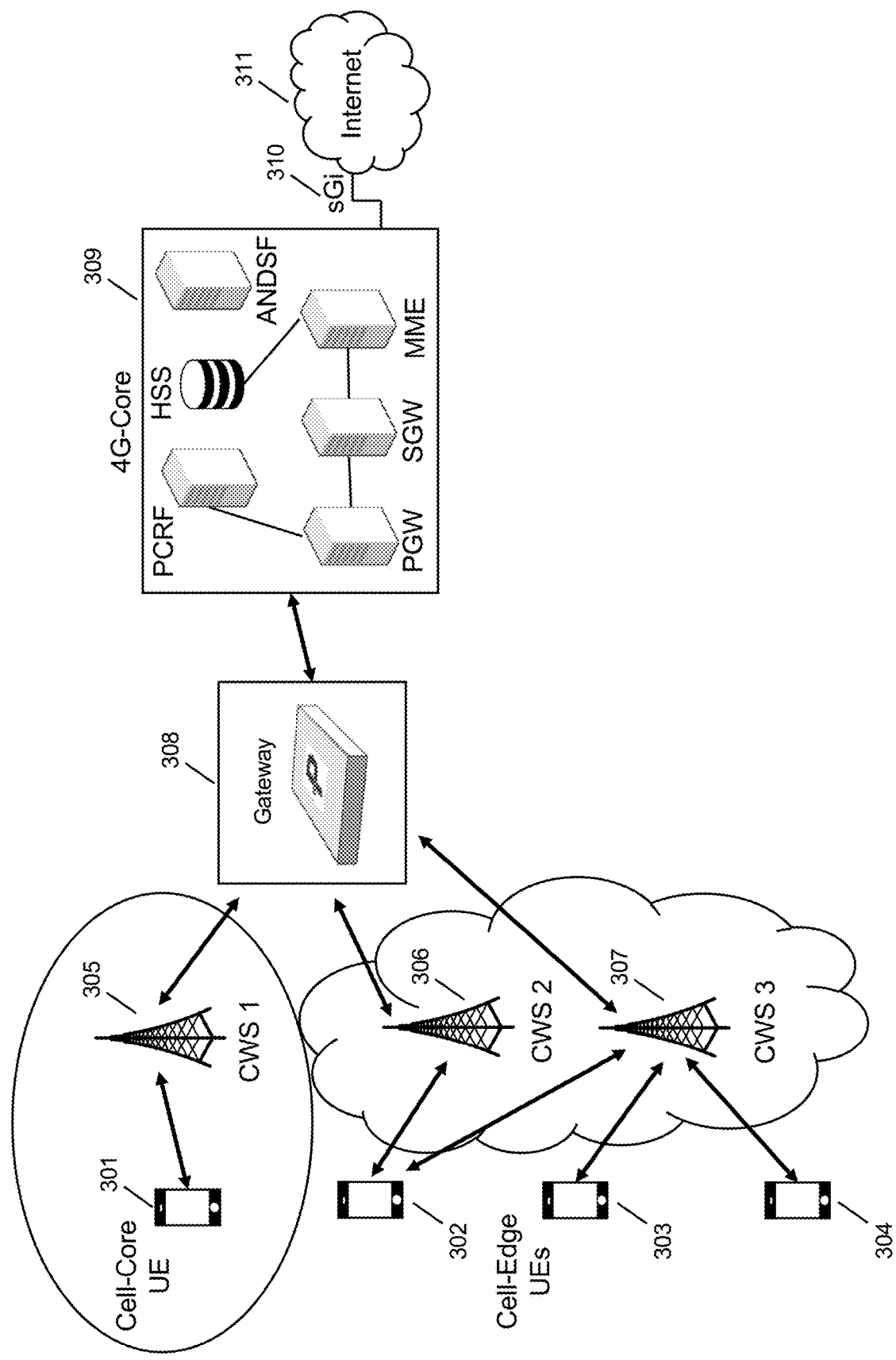
FIG. 3 depicts a network architecture showing virtual cell clusters, in accordance with some embodiments.

FIG. 3 depicts a network architecture showing virtual cell clusters, in accordance with some embodiments. This figure focuses on LTE. Under the HNG, which represents itself to the core network as a single virtualized eNodeB, there are physical cells: CWS-1, CWS-2, CWS-3, but also a cluster formed by CWS-2 and CWS-3. This cluster is the virtual cell discussed herein.

Figure 4:
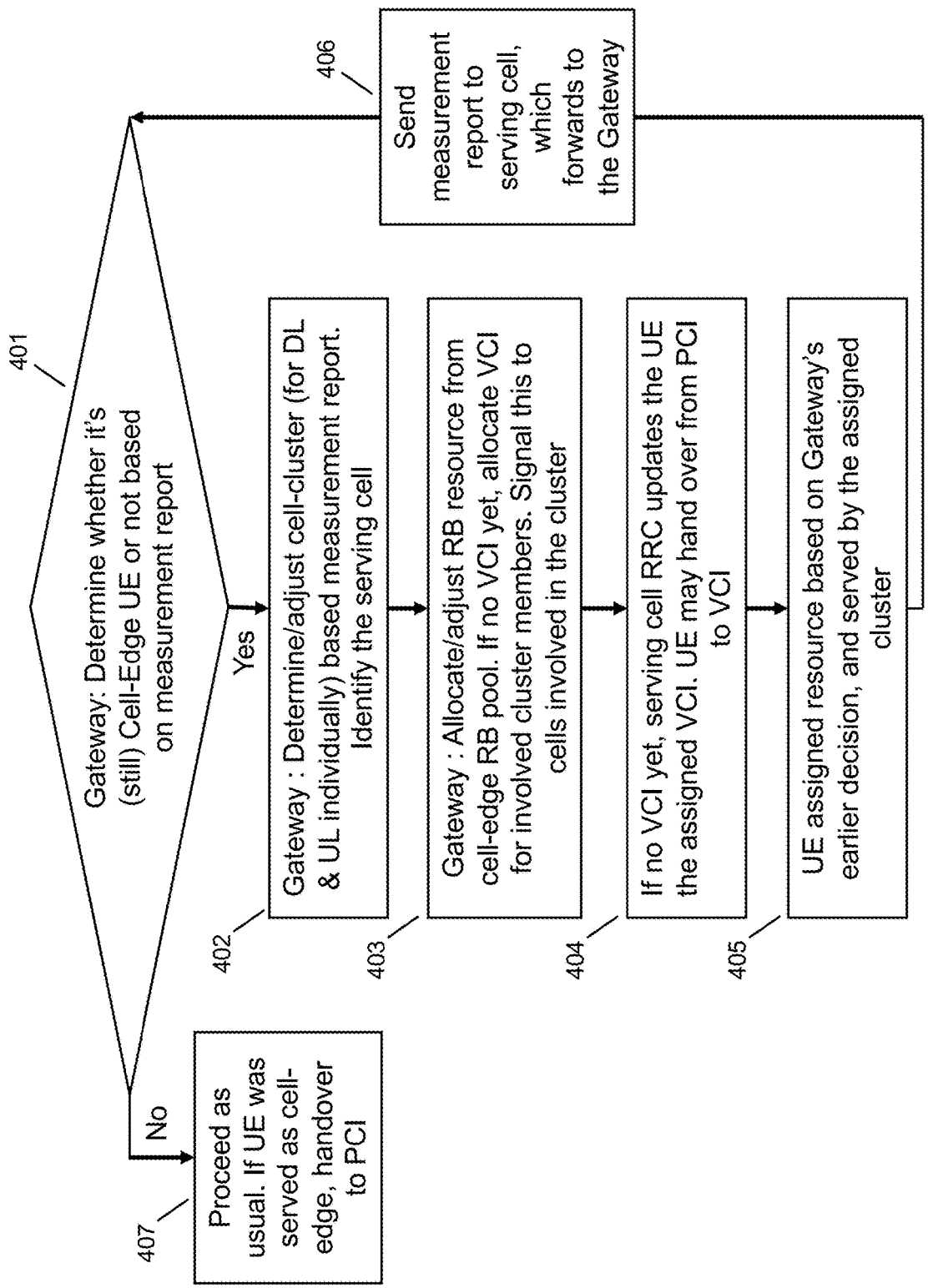
FIG. 4 depicts a flowchart for assigning cell-edge users to a virtual cell, in accordance with some embodiments.

FIG. 4 depicts a flowchart for assigning cell-edge users to a virtual cell, in accordance with some embodiments. At 401, the gateway or coordinating node may determine whether it's (still) Cell-Edge UE or not based on measurement report. If no, at 407 it is determined to proceed as usual. If UE was served as cell-edge, handover to physical cell having a known PCI. If yes, at 402, the gateway may Determine/adjust cell-cluster (for DL & UL individually) based measurement report. Identify the serving cell. At 403, the gateway may Allocate/adjust RB resource from cell-edge RB pool. If no VCI yet, allocate VCI for involved cluster members. Signal this to cells involved in the cluster. At 404, If no VCI yet, serving cell RRC updates the UE the assigned VCI. UE may hand over from PCI to the newly-allocated virtual cell having the VCI. At 405, UE assigned resource based on Gateway's earlier decision, and served by the assigned cluster. At 406, the UE may send a measurement report to the serving cell, which forwards to the Gateway. The gateway then may reassess whether the UE should be in the virtual cell, as per step 401. The Virtual Cell ID, as discussed herein, in the context of LTE, has the following characteristics, in some embodiments. VCI will be constructed the same as normal Physical Cell ID (PCI), which is physically derived from PSS and SSS (=3×SSS+PSS). VCI is a logical construct—one ID assigned to cell-edge UE, delineating a cluster of UL and DL cells, which can be different. VCI will be assigned by HNG, communicated by the serving cell to the UE via RRC messages. During network operation, based on UE's measurement report, the cluster member associated with the VCI may be updated dynamically. The original PCI will still be used by UE as included in the measurement report to identify the cell cluster for this UE. With VCI, UE in the C-DRX state does not need to go thru hand handover during mobility over the cell-edge.

Figure 5:
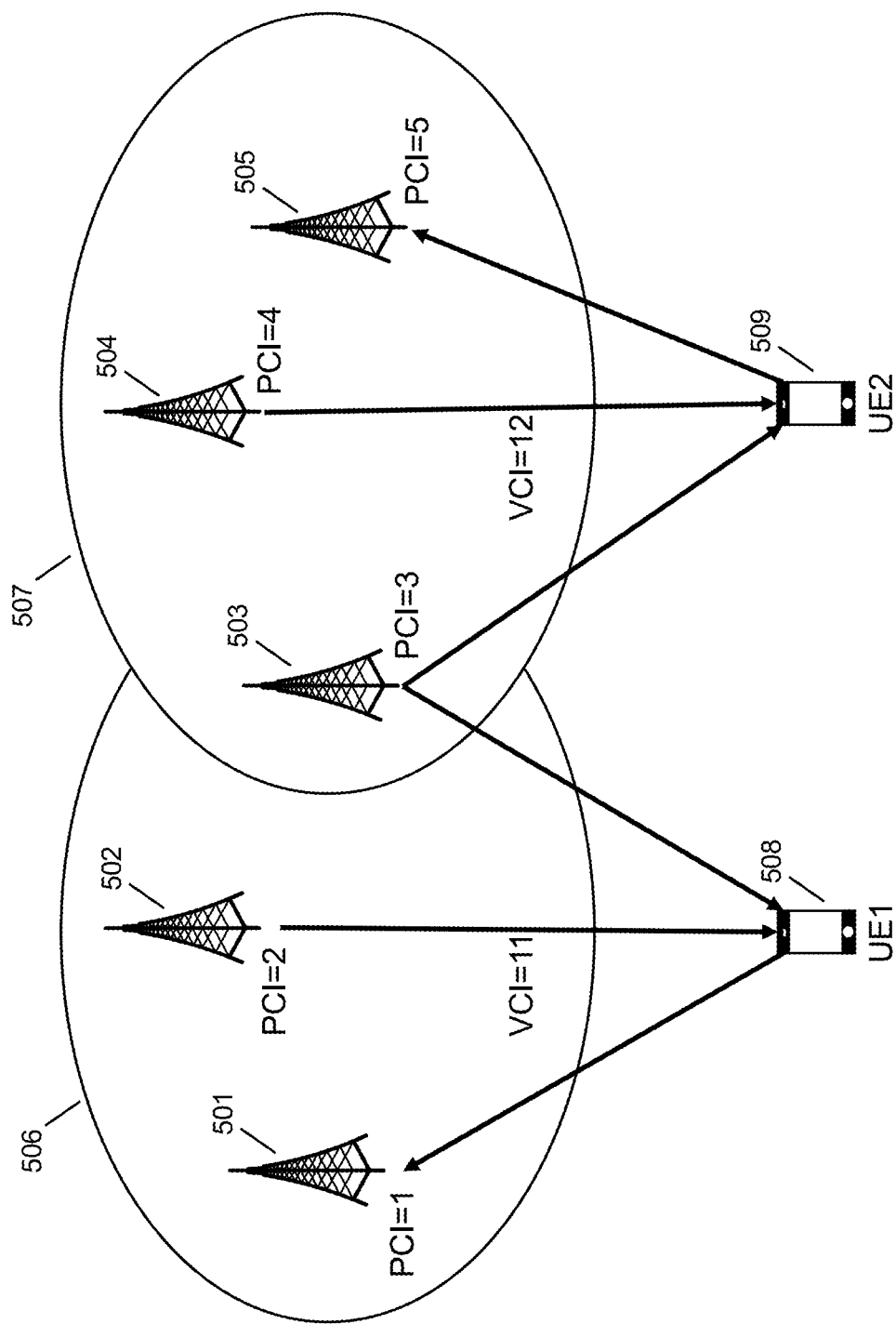
FIG. 5 depicts virtual cell IDs in accordance with some embodiments.

FIG. 5 depicts virtual cell IDs in accordance with some embodiments. UE1 508 is attached to virtual cell 506 with VCI=11, and virtual cell 506 includes member base stations 501, 502, and 503, having PCI=1, PCI=2, and PCI=3 respectively. UE2 is attached to virtual cell 507 with VCI=12, and member base stations 503, 504, and 505, with PCI=3, PCI=4, and PCI=5, respectively. PCIs are given here for identification purposes only and may or may not reflect the requirement described elsewhere herein that PCI allocation not cause conflicts between the actual PCI and the VCI. Note that base station 503 is a member of both virtual cell 506 and virtual cell 507; since the virtual cell is a logical cell, the only limit to how many virtual cells a physical base station can belong to is the complexities required to construct a signal that simultaneously includes all the PCIs and VCIs and includes appropriate space for control signals. (Since the PCIs must be separated by mod-6 RB's, the limit may be 5 cells.) If UE1 moves around within virtual cell 506, it need not perform any handover at all. If UE1 moves into the area of base station 503, UE1 may avoid a hard handover by instead performing a handover from virtual cell 506 to virtual cell 507 while remaining at the cell center area of base station 503, thereby saving power and spectral efficiency, and with a low error rate.

Once a CWS has been decided by HNG to join one Virtual Cell formation, this CWS will present more than one cell identities to the UE. According to 3GPP LTE standards, both PSS and SSS require 72 REs (62+10) to deliver 62 bits to construct Zadoff-Chu sequence. Via this, one CWS can present itself as multiple virtual cell instances, and the minimal spectrum granularity per virtual cell is 1.4 MHz (6 PRB). This allows the virtual cell to be instantiated by presenting multiple PCIs from the CWS to the UE. Only 6 PRBs are needed to deliver the necessary 72 REs, so radio resources are not unnecessarily constrained.

This instantiation process only requires changes on the base-station side (PW-CWS), transparent to the UE. From UE's perspective, there is no difference between virtual and physical cell instances. Cells as part of the same cluster will populate the same VCI. Multiple virtual-cell cluster members will be perceived by the UE as MIMO antennas.

No change is needed on the UE side, and no change to the current cell search procedure is required, in some embodiments. For the uplink (UL) implementation: no changes to the UE needed. R8/9/10 UE can be used as is.

In some embodiments, for a multiple-antenna UE, such as one capable of MIMO, each antenna could be used to communicate with one of the cells, or all antennas could be used to obtain uncorrelated signals from all the virtual cells, for instance using interference rejection combining (IRC). The UL signal muxing function is required on the eNB (CWS) side. For the downlink (DL implementation: We can start with virtual cluster member size of 2. In this case, each member transmitter (although physically separated apart) will be treated as a virtual MIMO antenna. Cat-4 UE (R8) with closed-loop 2×2 MIMO capability is sufficient. Once we increase virtual cluster member size to 4 and above, other UE categories would be needed (for example, Cat-6 or 7 UE).

3GPP TS 36.306 (hereby incorporated by reference) lists the UE categories (categories 1 through 12 specified at the time of filing, with additional categories being contemplated and added to the standard over time). Each UE category has additional total bandwidth due to more spatial multiplexing layers, modulation, etc. These additional dimensions as added to the LTE signal further reduce the percentage of overhead used by the disclosed technique, and the disclosed technique can continue to be used even as additional UE capabilities arise. Further, as the 5G RF and scheduling mechanisms are nearly identical in the relevant ways to 4G, all of the disclosed techniques herein could be used to provide virtual cells, virtual personal cells, multiplexed virtual cells, etc. on 5G radio carriers as well.

Turning to scheduling, a hybrid scheduling scheme is described wherein a small pool of RB blocks are reserved for cell-edge UEs and scheduled by HNG as central sources. The % of such cell-edge resource pool is adjustable based on cell-edge usage condition. Resources scheduled by the HNG include RB allocation for PDSCH, PUSCH, PUCCH and PDCCH. It's proposed that HNG will allocate the cell-edge resource 5 ms ahead of time, in some embodiments. The rest of RB resources will be scheduled by each individual eNB for cell-core UEs. U.S. Pat. Pub. Nos. US20170127409A1 and US20170202006A1, which further describe hybrid scheduling, are hereby incorporated by reference for all purposes.

In some embodiments, creation of virtual cells may be as follows. In order to seamlessly create the virtual cell instances, the set of resources allocated to the virtual cell should be blocked out from the original cell scheduler (although virtually existing as part of the original cell). The PSS & SSS region separation is easy, as long as the central 6 PRB region are disjoint. User plane separation is easy, as long as PUSCH and PDSCH RB resource allocation is disjoint. But how about control plane—PDCCH and PUCCH? This discussion follows.

For PDCCH, at eNB (sender side): § Find the total number of RE's available for PDCCH allocation; § From RE's find total number of CCE's available; For a particular UE, generate a DCI message to be mapped onto PDCCH § Find number of CCE's that can be allocated to this UE; Decide CCE index; Code this message to form coded DCI bits. At UE (receiver side): Process first symbol of first subframe. This is PCFICH channel § Via PCFICH, find how many symbols are used for PDCCH; Calculate CCE index for PDCCH; Decode PDCCH and find DCI; From DCI, find location of PDSCH and decode it.

It is important to decide UE's CCE Index Carrying DCI. Given that virtual cell typically will be allocated small amount of RB blocks (typically <=16 PRBs), in general case, CCE index will be allocated in its common search space, based on its aggregation level. The original cell may allocate CCE in either common search space, or UE specific search space, via 3GPP procedure, avoiding the regions allocated to the virtual cells. See, e.g., https://nehakatyal2007.wordpress.com/2015/05/20/pdcch-2/.

The exact position of PCFICH is a function of PCI, according to 36.211 6.7:

$Z^{(P)}(0)$ is mapped to the resource-element group represented by $k=\bar{k}$ $Z^{(P)}(1)$ is mapped to the resource-element group represented by $k=\bar{k}+[N_{RB}^{DL}/2] \cdot N_{SC}^{RB}/2$ $Z^{(P)}(2)$ is mapped to the resource-element group represented by $k=\bar{k}+[2N_{RB}^{DL}/2] \cdot N_{SC}^{RB}/2$ $Z^{(P)}(3)$ is mapped to the resource-element group represented by $k=\bar{k}+[3N_{RB}^{DL}/2] \cdot N_{SC}^{RB}/2$ were the additions are modulo $N_{RB}^{DL} N_{SC}^{RB}$, $$\bar{k}=(N_{SC}^{RB}/2) \cdot (N_{ID}^{cell} \bmod 2N_{RB}^{DL})$$

Since the position is controlled by PCI, the original cell's PCI needs to be allocated with virtual cell in consideration so that the PCFICH region allocated to the original cell won't overlap with the RE regions allocated to virtual cells. See, e.g., http://www.simpletechpost.com/2013/09/physical-control-form-at-indicator.html.

For PHICH, Virtual cell: map PHICH groups to virtual cell resources as is according to 36.211 6.9.3. Original cell: map PHICH groups as is according to 36.211 6.9.3, avoiding RE allocated to the virtual cell. It can also be arranged backwards. Virtual cell resource can be allocated avoiding PHICH regions allocated by original cell or other virtual cells. See, e.g., http://www.sharetechnote.com/html/Handbook_LTE_PHICH_PHICHGroup.html Parallel Proprietary and Confidential For PBCH, the same as PSS & SSS, PBCH is mapped to the central 6RBs, but different symbol, as shown below. So the same trick applied to PSS & SSS can be applied to PBCH. See., e.g., http://www.rfwireless-world.com/Terminology/LTE-PBCH-Physical-Broadcast-Channel.html.

For the downlink reference signal (RS), As shown below, RS's position is mainly determined by PCI as well. So as long as original cell's PCI & virtual cell's PCI maintains mod-6 difference, their RS will be mapped into different RE position. This implies one CWS can populate up to 5 virtual cells. See e.g., 3GPP 36.211 6.10.1.2 and http://www.sharetechnote.com/html/Handbook_LTE_Reference_Signal_Downlink.html.

For PUCCH, Uplink control channel resolution is relatively straight forward given that RBs assigned to PUCCH is frequency wise aligned with top & bottom PRBs assigned to each UE. As long as the original cell and the virtual cell allocate different UL RB to the UE, it will ensure no PUCCH interference. See, e.g., http://lte-question.blogspot.com/2013/07/pucch-mixed-mode-and-format-types.html and 3GPP 36.211 5.4.3

Figure 6:
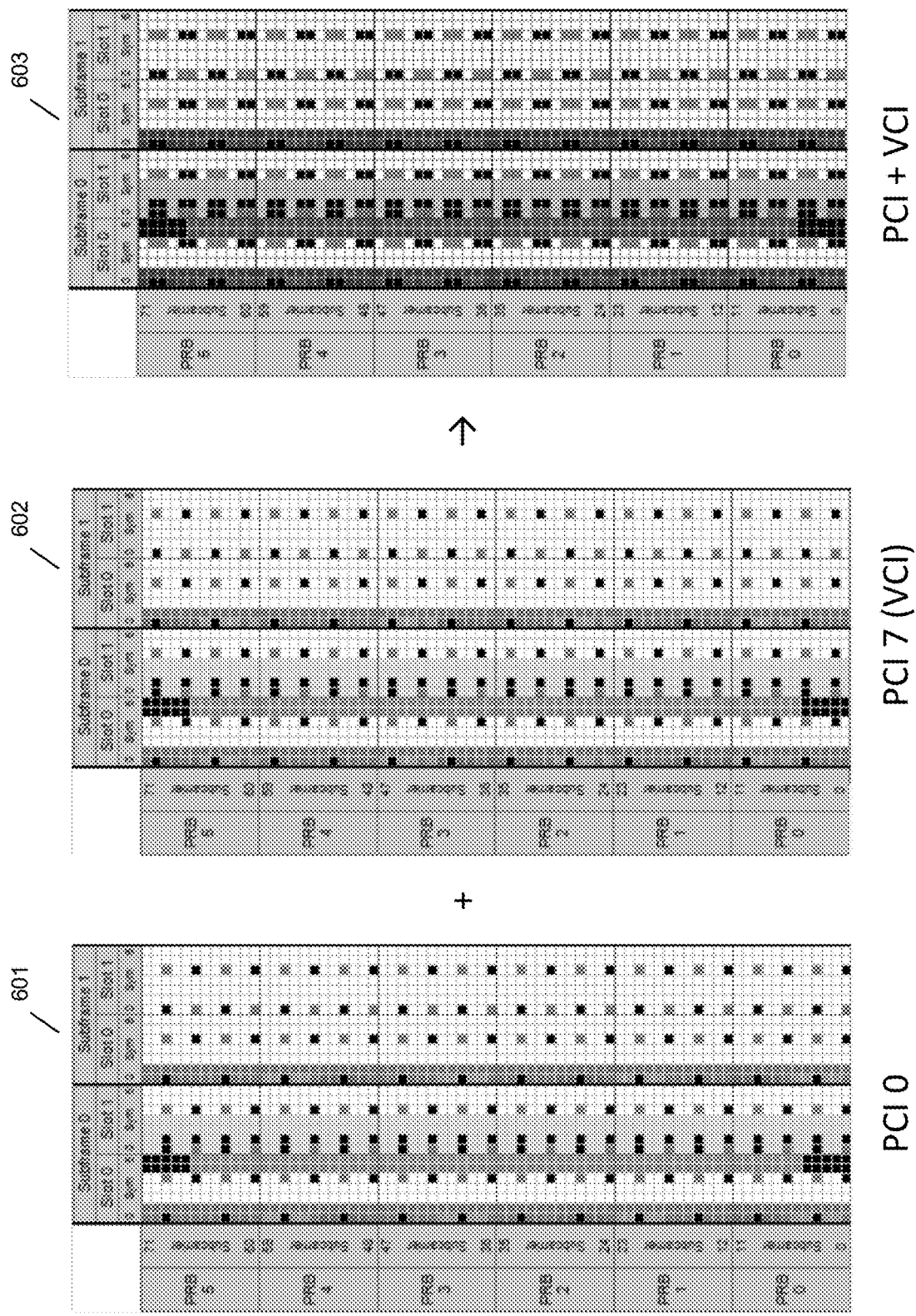
FIG. 6 shows two PCIs being overlapped in a single signal, in accordance with some embodiments.

FIG. 6 shows two PCIs being overlapped in a single signal, in accordance with some embodiments. Typically the PCI value determines the location for the reference signal. Here, two PCI values have been chosen, in signal 601 for the regular cell and in signal 602 for the virtual cell, such that when both 601 and 602 are combined in a single signal 603, no overwriting of the necessary resource entities and resource blocks occurs. For convenience only a portion of the overall frame is shown.

The following is the process of LTE Cell Search from UE's perspective. Once power-up UE, UE will do initial cell search and try to camp on suitable cell. Following is general UE's procedure on cell search. 1. UE has no knowledge of any close-by band, bandwidth and pilot signal. UE has to do a step called "RSSI scan" before actual cell search started. (This RSSI concept is different than the RSSI associated with RSRP and RSRQ). During RSSI scan, UE first filter which band it should scan on, this could be done by applying software filter, I.E. UE supported Band3, Band4, Band5 and Band13, once power up, UE would start detecting power for every 20 MHz chunk starting from lowest frequency in Band3. 2. After RSSI scan phase, UE would have knowledge about which EARFCN is transmitting, and power strength. i.e., EARFCN 2170 has highest power level. 3. Pinpointing EARFCN 2170 as central frequency with 6 PRBs as cell search bandwidth, UE first acquire PSS (For FDD, located at the last symbol of slot 0 and slot 10; For TDD, located at third symbol of subframe 1 and 6), PSS is a Zadoff-Chu sequence with length of 62 bits. PSS's root sequence has information about NID2 (3 possible root sequence mapping to 0,1,2 NID2). Since PSS's two appearances in one radio frame is the same, UE only knows 5 ms timing with PSS. 4. After acquired PSS, UE has knowledge of system frame timing but not subframe timing. In order to get subframe timing and calculate CellId, UE needs to acquire SSS (For FDD, located at 1 symbol before PSS; For TDD, second last symbol of slot 1 and slot 11). The sequences that SSS used in two different locations are different (3GPP 36.211 6.11.2). By acquiring SSS, UE can retrieve NID1 and 10 ms timing information. 5. After acquired PSS and SSS, UE is now able to do following steps: (1) Calculate CellId, CellId=3*NID1+NID2. This CellId will be used to de-scrambling PBCH bits; (2) Decode PBCH (MIB, is transmitted every 4 radio frames), which is located in slot 1 of subframe 0; (3) Successfully decoded MIB provided 8 bits of SFN (last 2 bits of SFN is implicitly acquired in decoding PBCH), system bandwidth and PHICH configuration information (PHICH duration and PHICH Ng factor). 6. MIB was also coded by number of antenna ports. After retrieved MIB and CellId, UE is now able to do following steps: (1) Decode PCFICH and get number of symbols used for PDCCH. (2) Locate REs used for CRS (by calculating Vshift using CellId); (3) Locate REs used for PHICH; (4) Calculate remaining REs left for PDCCH. 7. UE is now in state waiting for System Information. UE would do blind-decoding of CCE on aggregation level 4 and 8 using SI-RNTI (65535). 8. After successful decoding SystemInformationBlock1 and other SIBS, UE has common RRC configuration information of the cell and can do random access now.

Figure 7A:
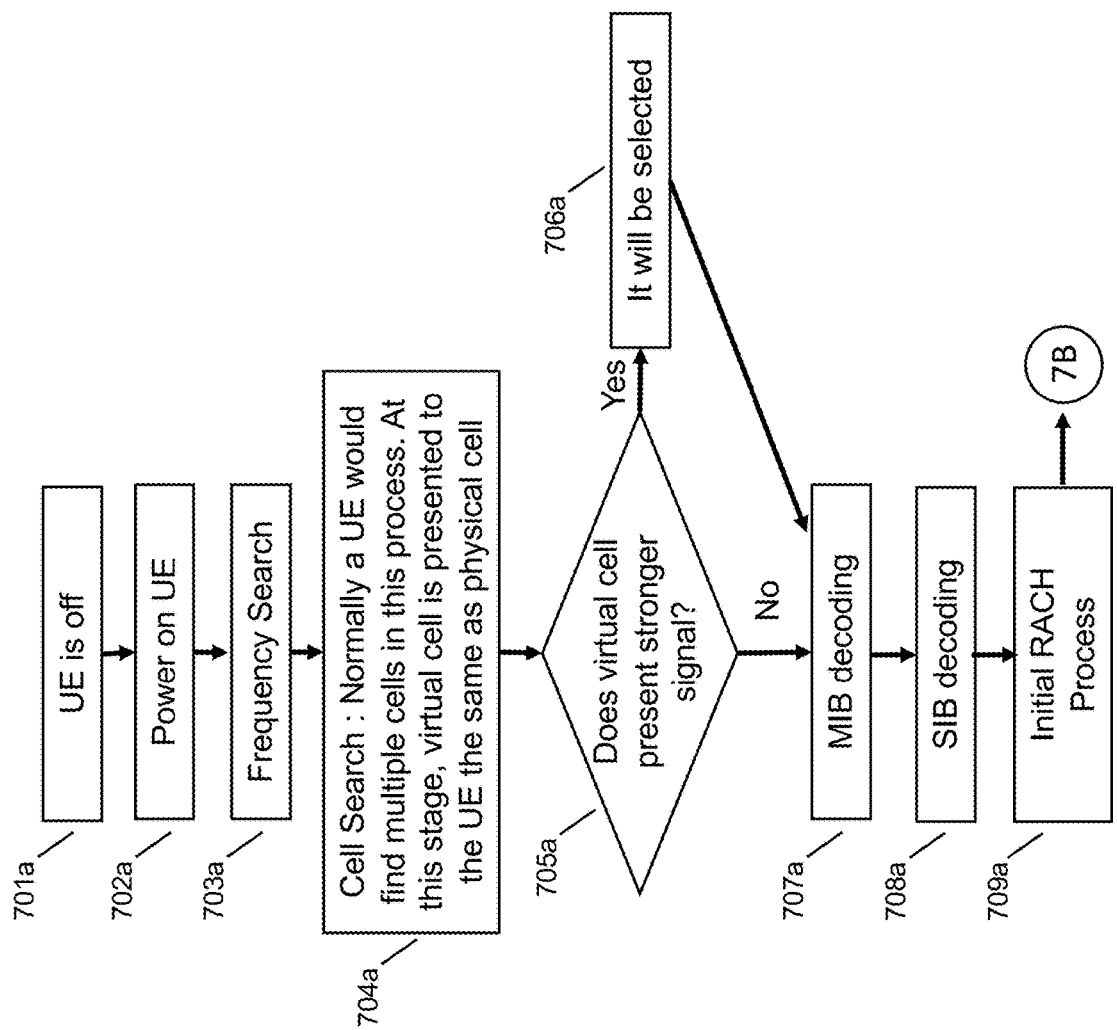
FIGS. 7A, 7B, and 7C depict a flowchart for an eNodeB supporting a virtual cell, from the eNodeB's perspective, in some embodiments.
Figure 7B:
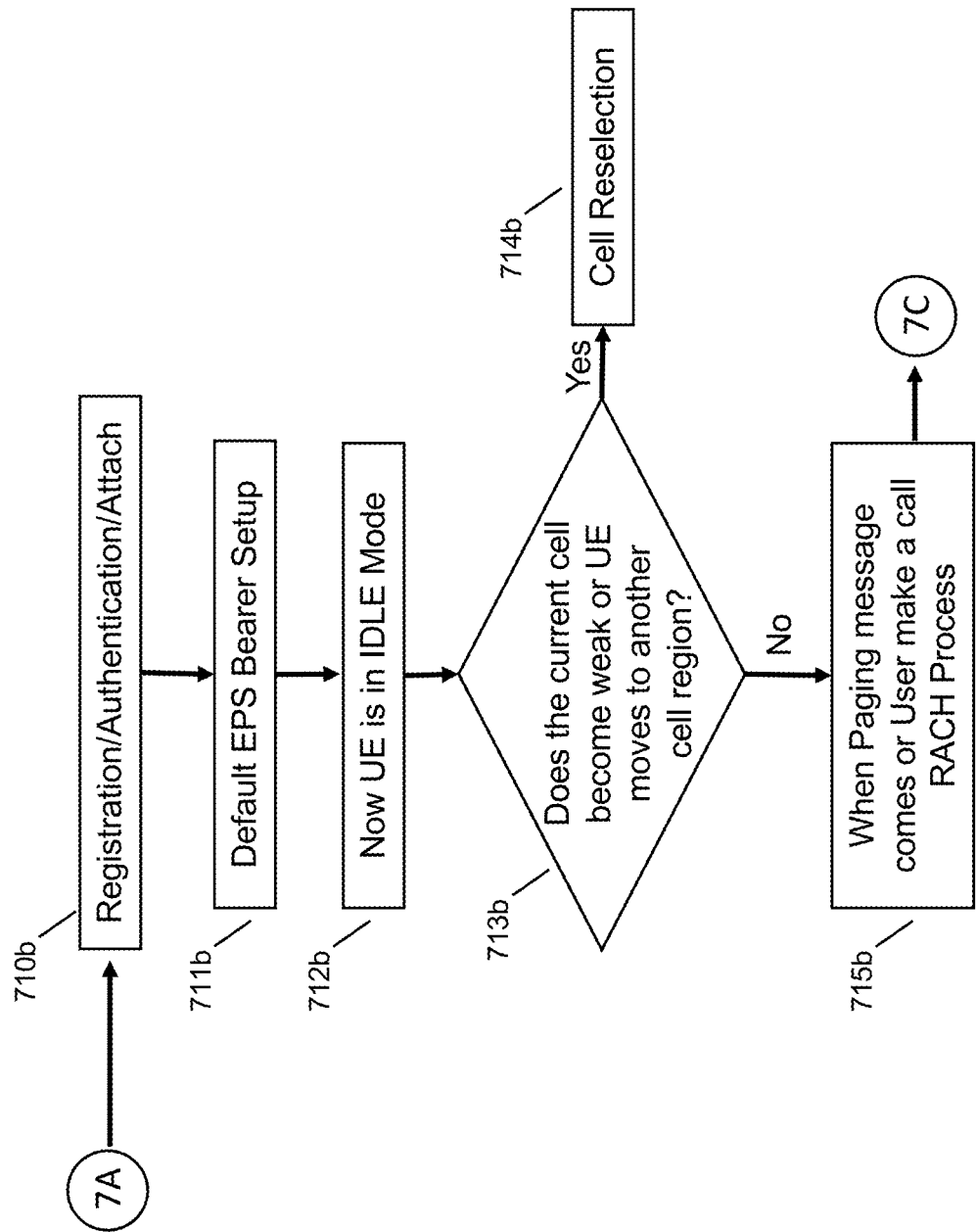
Figure 7C:
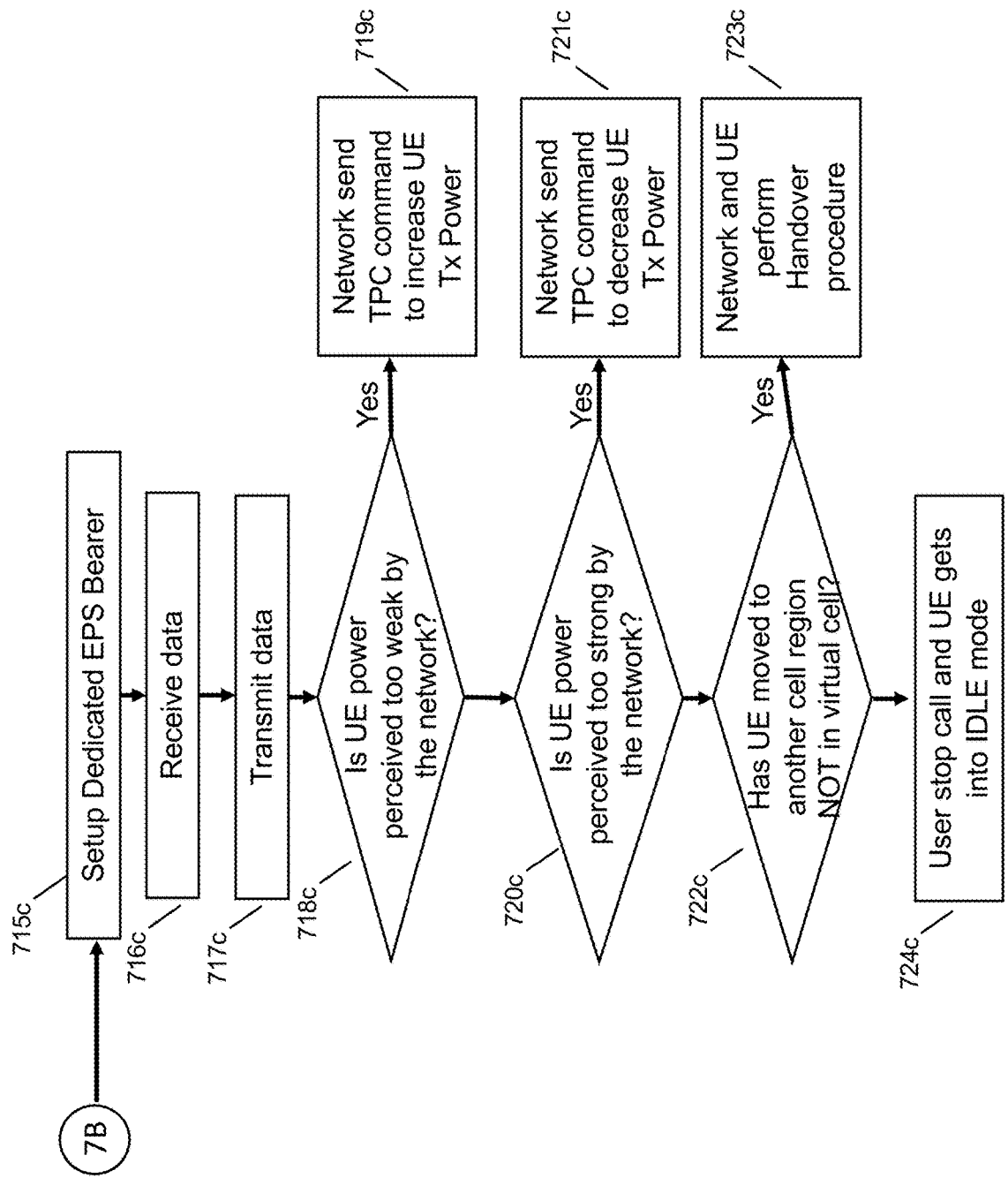

FIGS. 7A, 7B, and 7C depict a flowchart for an eNodeB supporting a virtual cell, from the eNodeB's perspective, in some embodiments. In FIG. 7A, at step 701*a*, the UE is off. When it turns on 702*a*, it begins to look for a cell to attach to (frequency search) 703*a*. Typically, a UE would find multiple cells in this process. At this stage, virtual cell is presented to the UE the same as a physical cell 704*a*; this is done as is described elsewhere herein, with the eNodeB constructing a signal that has more than one embedded cell ID in it such that the UE, when interpreting the received signal, determines that more than one cell is present and determines that certain RF energy should be associated with each of the discovered cells. At step 705*a* the UE determines whether the virtual cell presents a stronger signal. The strength of the signal of the virtual cell is determined by the L1 processing of the UE, which in most UEs is performed by measuring radio energy in each portion of the band that is advertised by a particular cell. Given that the virtual cell will have multiple base stations (2 or more) contributing to its energy, its energy at the cell edge should be greater than the energy of any other individual cell. At step 706*a*, since the virtual cell has greater energy it is selected.

At step 707*a*, master information block (MIB) for whatever the selected cell is will occur, and at 708*a*, system information block (SIB) decoding occurs. At step 709*a*, an initial attach (e.g., RACH) process occurs. Turning to FIG. 7B, at step 710*b*, registration/authentication/attach occurs, default EPS bearer setup 711*b* occurs, and the UE returns to IDLE mode 712*b*. Each eNodeB in the virtual cell should be configured to accept RACH, bearer setup, and other messages with both its regular PCI and with the virtual VCI, and should return messages appropriately to the UE reflecting the cell that the UE thinks it is attached to. This can be managed transparently at the HNG, which is a virtualizing gateway and which suppresses or rewrites the cell ID as part of its virtualizing role towards the core network, e.g., the HNG represents itself as a single eNodeB for all cells that it is managing and, therefore, is already rewriting attach requests to appear as though they are emanating from the HNG.

Subsequently the UE begins to be mobile. At step 713*b*, if the UE perceives the cell as becoming weak, such as due to the UE moving to another cell's region, cell reselection is evaluated and performed 714*b*. This process is well-understood in the art, but with the method disclosed herein, if the UE is attached to the virtual cell, it is receiving energy from more than one physical cell, resulting in the virtual cell not appearing weak at the boundary between two cells that are part of the virtual cell (which otherwise would be the cell edge). No reselection is required for any mobility happening within the coverage area of any of the base stations in the virtual cell, in other words.

At 715*b*, when a paging message or a call occurs, RACH occurs. Turning to FIG. 7C, at 715*c* the EPS bearer for the data or call is set up, data is received 716*c*, and data is transmitted 717*c*. Uplink transmissions from the UE attached to the virtual cell are received by all base stations in the virtual cell, and the coordinating node may determine statically or dynamically whether to use the signal received at one particular member cell, or to use multiple received signals together as though each base station is an individual antenna in a MIMO system. Downlink transmissions may be coordinated by the coordinating node as well, such that they may be sent to the UE via one member cell, or multiple member cells as a MIMO signal. If UE power is perceived to be too weak 718*c*, the network requests an increase in UE power 719*c*; this may be coordinated at the coordinating node, as a rule, since each base station only sees its own local radio environment regarding the UE. Since the UE may be out of range of one or more members of the virtual cell, the coordinating node may track the state of the UE in a state machine, and each base station may be configured to receive state information from the coordinating node (or alternately, may be controlled as a slave of the coordinating node without tracking the state of the UE).

If UE power is perceived too strong 720c, the network may request decreased UE power 721c. If the UE has moved to another cell region, not in the virtual cell, 722c, handover may be performed 723c. Termination of the call results in the UE going IDLE 724c. Note that handovers within the virtual cell are now treated similarly to "soft handovers" in 3G, in that there is no connection termination of the "handing out" cell; instead, since all cells in the virtual cell are transmitting data to the UE, the UE continues to receive data throughout.

FIGS. 8A-8E show uplink and downlink signal processing using a virtual cell, in some embodiments. Depending on the scenario, overlapping (assign same frequency to two UEs at the cell edge or non-overlapping bands can be assigned to UEs, and MIMO and spatial diversity can be leveraged where supported by the UE to provide additional benefits, e.g., spectrum gain. Either IRC or MRC may be used. Interference Rejection Combining (IRC) regenerates the transmitted signal based on the estimated data from the previous receptions, emulate the distortion occurring from the multi-path channels and, finally subtract all regenerated interfering signals from the uplink received signals to obtain more reliable estimation of original users' data. This feature utilizes the spatial separation and characteristics of inter-cell interference to determine the power of the interfering UE which belongs to another cell. Once the pattern and power level are determined, the victim cell can then remove the interferer from the received signals. By contrast, Maximum ratio combining (MRC) do not make use of the spatial characteristics of the interference when calculating antenna weighting.

Figure 8A:
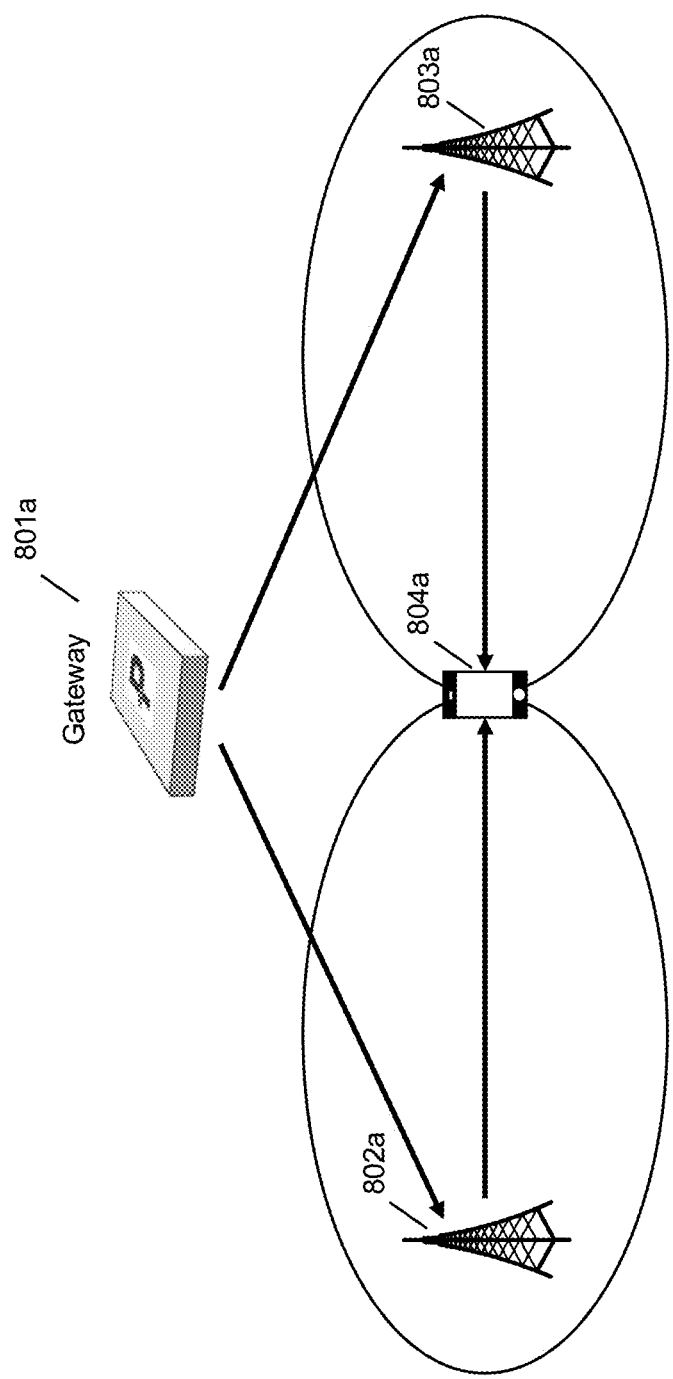
FIGS. 8A-8E show uplink and downlink signal processing using a virtual cell, in some embodiments.

FIG. 8A shows downlink processing in accordance with some embodiments. In the simplest form, assigning non-overlapping bandwidth to different UEs—diversity gain will be achieved. Main Benefit is improved cell-edge signal quality. Two base stations simultaneously transmit to a single UE. N×N MIMO is used to by UE to construct the DL signal. Different UEs are assigned different bandwidth.

Figure 8B:
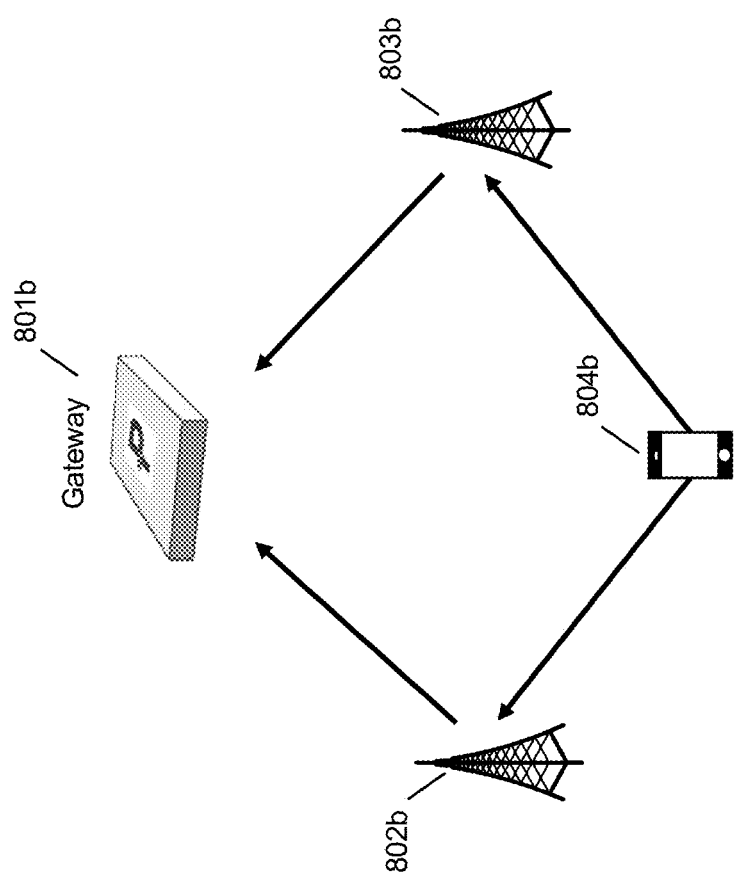

FIG. 8B shows uplink processing in accordance with some embodiments. In the simplest form, assigning non-overlapping bandwidth to different UEs—diversity gain will be achieved. Main Benefit: improve cell-edge signal quality. The UE is granted a portion of bandwidth by the virtual cell, and transmits on that bandwidth; it is received by both base stations in the virtual cell. IRC is used to construct the combined signal on the UL. Frame selection is performed at the HNG for cell-edge UEs.

Figure 8C:
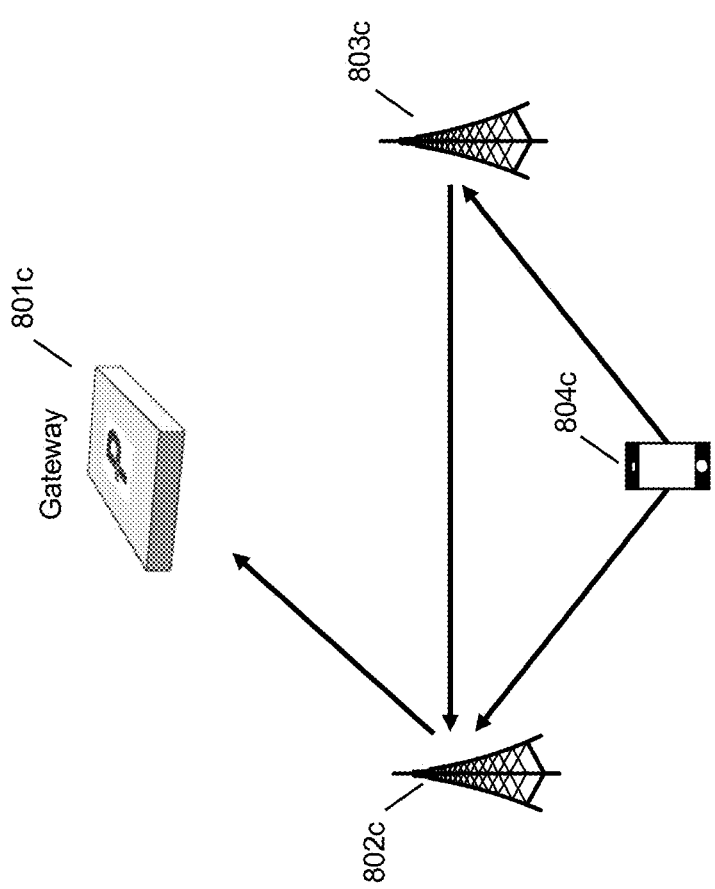

FIG. 8C shows a second case of uplink processing in accordance with some embodiments, with frame selection being performed at the serving cell. The selection of the cluster anchor (cluster manager) being HNG or the serving cell is decided based on the latency differential calculation; the cluster anchor (the management node for the virtual cell) can be placed at the base station or in the RAN if necessary to provide improved latency characteristics instead of placing it at the HNG. Latency becomes a concern when scheduling must be propagated to the base stations within an appropriate time.

Figure 8D:
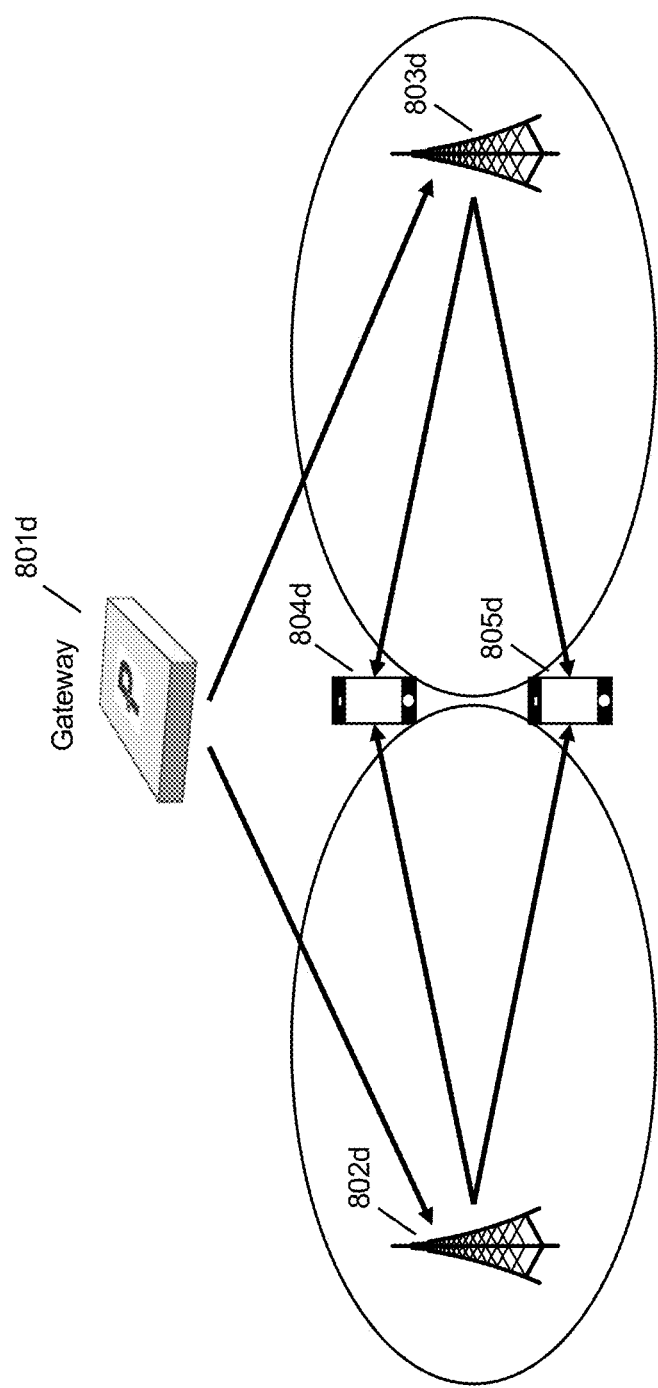

FIG. 8D shows downlink processing in accordance with some embodiments. Assigning overlapping bandwidth to paired UEs—both diversity and spectrum gain will be achieved. Main Benefit is improved cell-edge signal quality & spectrum efficiency. MRC is used by UE to construct the DL signal; Coherent frame transmission is assumed across eNBs and beamforming used to achieve spatial multiplexing gain. Or, MRC can be used by UE to construct the DL signal. Coherent frame transmission is assumed across eNBs. Modulated symbol multiplexing (via CDM or Network Coding Combination) is deployed to enable the same bandwidth allocated to multiple UEs, particularly suitable for VoLTE applications. On the UE side, modulated symbol de-multiplexing is required.

Figure 8E:
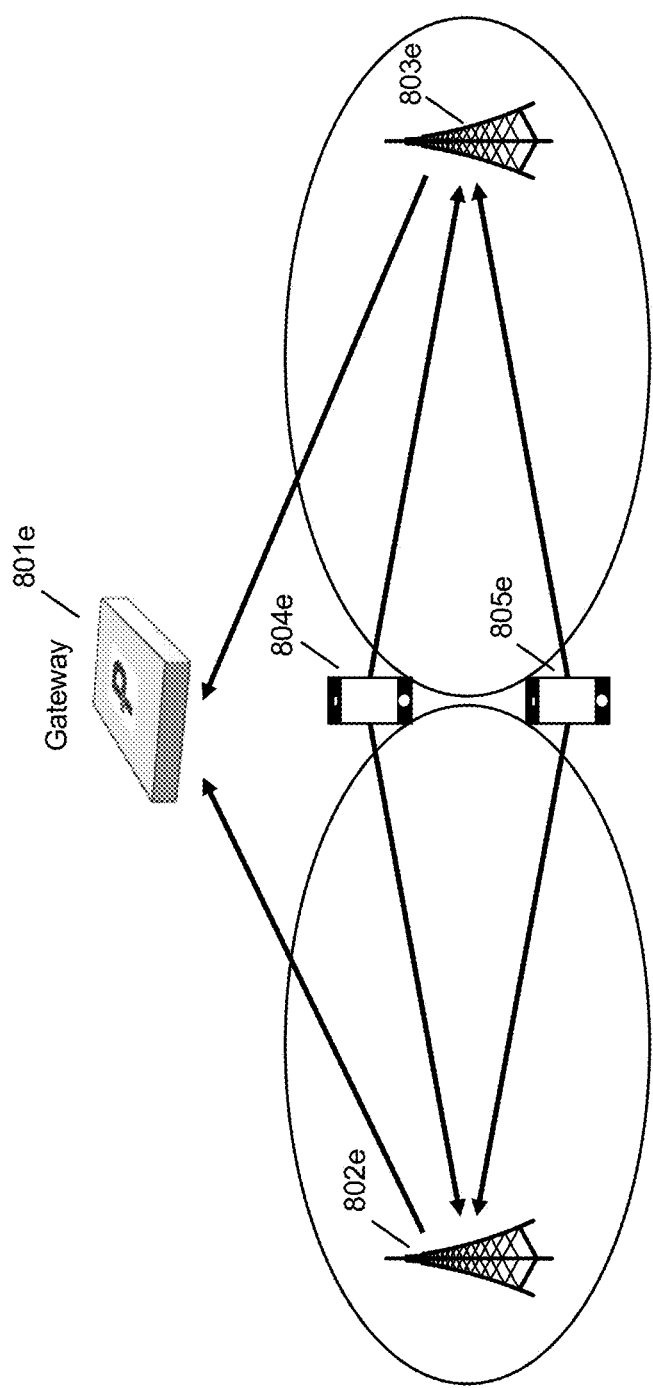

FIG. 8E shows a third case of uplink processing in accordance with some embodiments. IRC is used to construct the combined signal on the UL. Coherent frame transmission is assumed across eNBs. Beamforming used to achieve spatial multiplexing gain, and frame selection is performed at the HNG or serving-cell for cell-edge UEs. Or, modulated symbol multiplexing (at RE-mapping time domain) is deployed to enable the same bandwidth (RBs) allocated to multiple UEs, particularly suitable for VoLTE applications. On the eNB side, modulated symbol de-multiplexing (at RE-demapping time domain) is required. Frame selection is performed at the HNG or serving-cell for cell-edge UEs.

Figure 9:
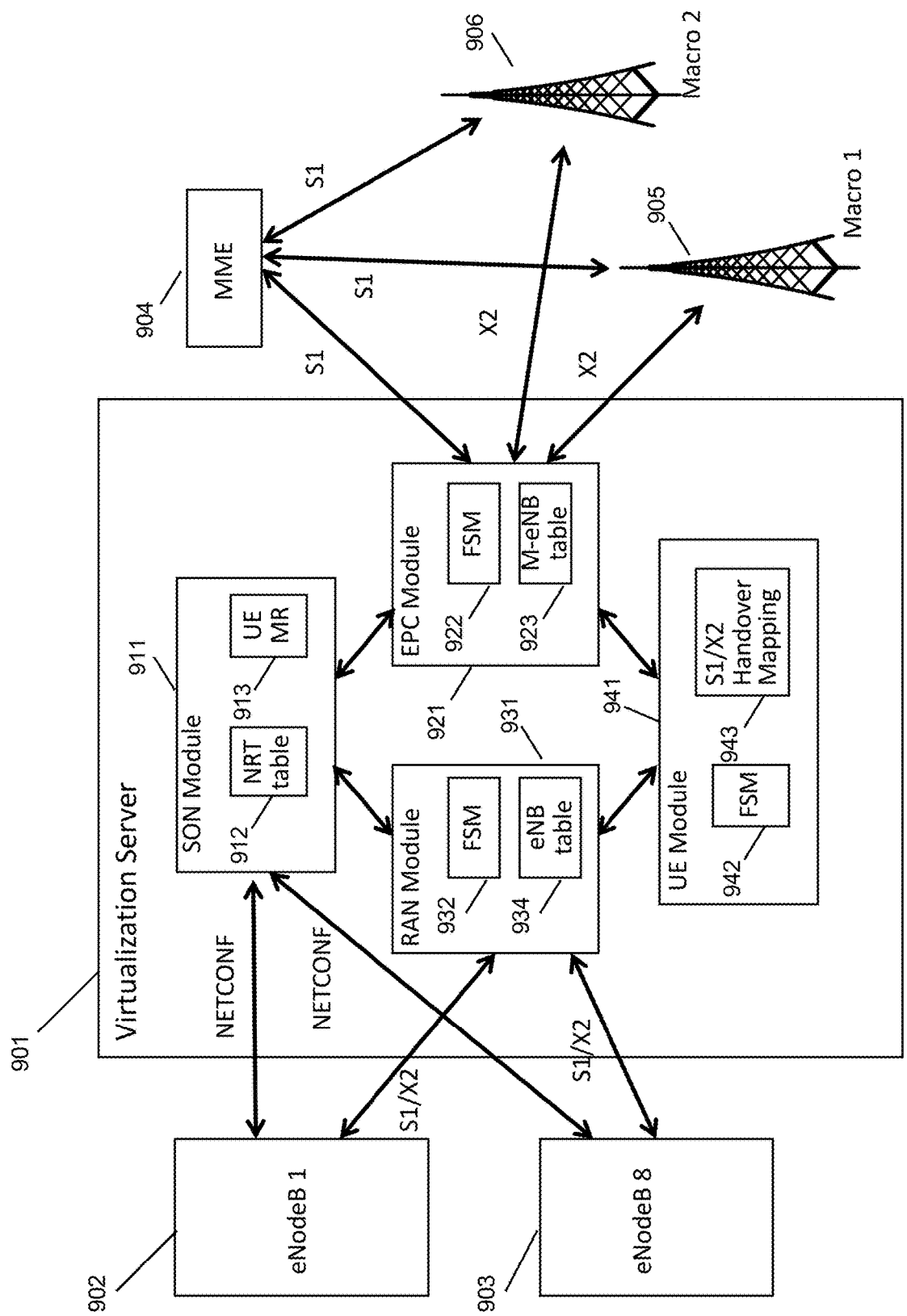
FIG. 9 is a schematic diagram of a base station management gateway in a Long Term Evolution (LTE) architecture, in accordance with some embodiments.

FIG. 9 is a schematic diagram of a base station management gateway in a Long Term Evolution (LTE) architecture, in accordance with some embodiments. Base station management server 901 provides services to, and is coupled to, eNodeB 1 902 and eNodeB 9 903, on a RAN side of a network (i.e., inside of the gateway). Base station management server 901 provides services to, and is coupled to, MME 904, macro eNodeB 905, and macro eNodeB 906, on a core network side of the network (outside of the gateway). Base station management server 901 corresponds to LAC 110, in some embodiments.

Within base station management gateway 901 are self-organizing network (SON) module 911, containing neighbor relation table (NRT) 912 and UE measurement report processing module 913; evolved packet core (EPC) module 921, containing EPC finite state machine module 922 and macro eNodeB table 923; radio access network (RAN) module 931, containing eNodeB finite state machine module 932 and eNodeB table 934; and user equipment (UE) module 941, containing UE finite state machine module 942 and S1/X2 handover mapping table 943. Each of modules 911, 921, 931, and 941 are coupled to each other within base station management gateway 901, and may execute on one or more shared processors (not shown) coupled with memory (not shown).

In some embodiments, SON module 911 may perform NRT maintenance, load information processing and fractional frequency reuse (FFR) processing; RAN module 931 may perform X2 association management with eNodeBs 902, 903; EPC module 921 may perform X2 association management with macro eNodeBs 905, 906; and UE module may perform X2 handover and S1/X2 translation between eNodeBs 902, 903 and macro eNodeBs 905, 906. All the above managers/modules interact with each other to accomplish the assigned functionality.

Figure 10:
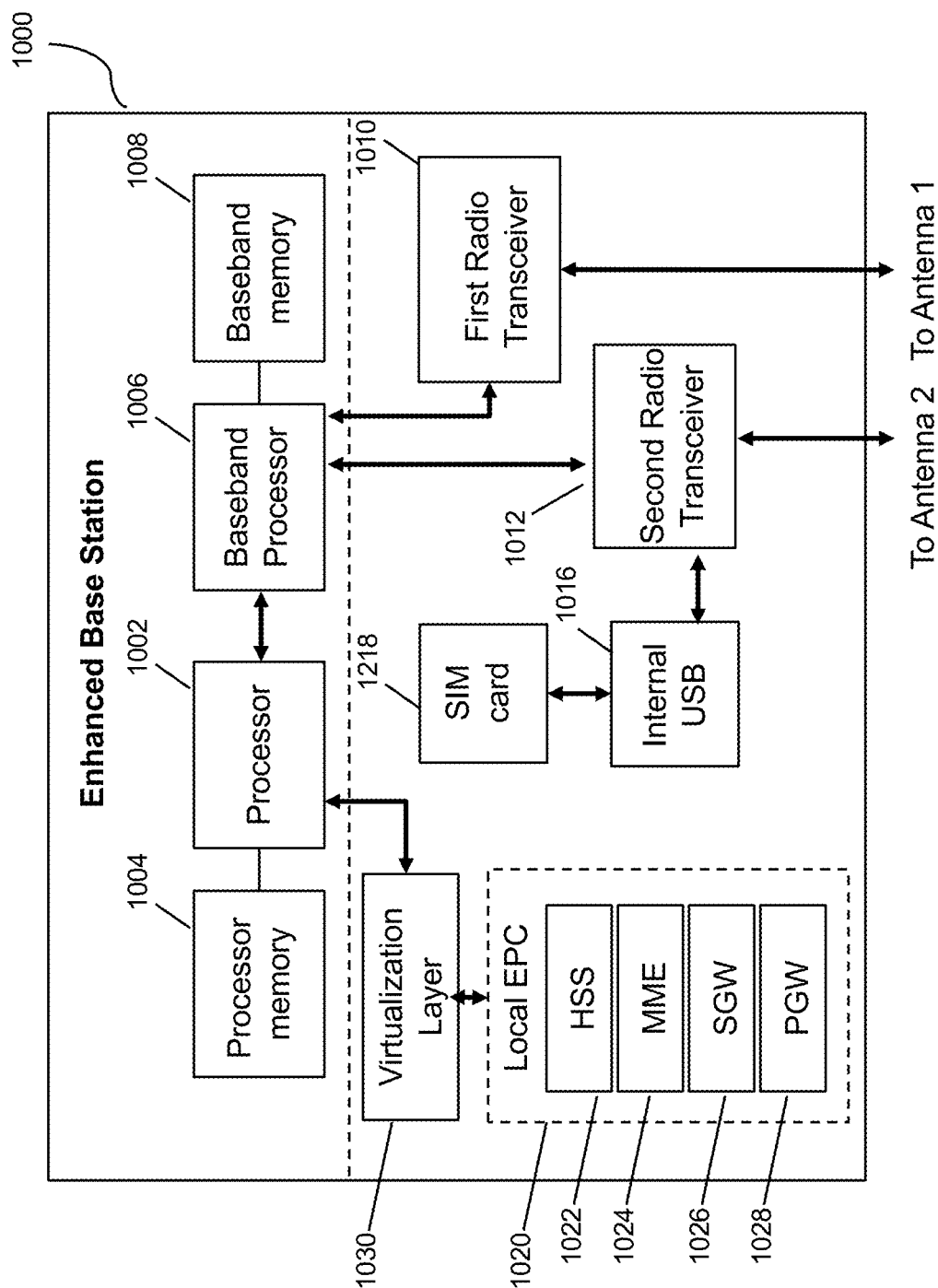
FIG. 10 is a schematic diagram of a mesh network base station, in accordance with some embodiments.

FIG. 10 is a schematic diagram of a mesh network base station, in accordance with some embodiments. Mesh network base station 1000 may include processor 1002, processor memory 1004 in communication with the processor, baseband processor 1006, and baseband processor memory 1008 in communication with the baseband processor. Base station 1000 may also include first radio transceiver 1010 and second radio transceiver 1012, internal universal serial bus (USB) port 1016, and subscriber information module card (SIM card) 1018 coupled to USB port 1014. In some embodiments, the second radio transceiver 1012 itself may be coupled to USB port 1016, and communications from the baseband processor may be passed through USB port 1016.

A virtualization layer 1030 may also be included for mediating communications with an evolved packet core EPC, specifically including the core network EPC (not shown) and local evolved packet core (EPC) module 1020. Local EPC 1020 may be used for authenticating users and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Virtualization layer 1030 and local EPC 1020 may each run on processor 1002 or on another processor, or may be located within another device.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1010 and 1012, based on instructions from processor 1002. In some embodiments, processors 1002 and 1006 may be on the same physical logic board. In other embodiments, they may be on separate logic boards.

The first radio transceiver 1010 may be a radio transceiver capable of providing LTE eNodeB functionality, and may be capable of higher power and multi-channel OFDMA. The second radio transceiver 1012 may be a radio transceiver capable of providing 3GPP WCDMA functionality. Both transceivers 1010 and 1012 are capable of receiving and transmitting on one or more bands. In some embodiments, transceiver 1010 may be capable of providing both LTE eNodeB and LTE UE functionality, and transceiver 1012 may be capable of UMTS BTS functionality, UMTS UE functionality, or both. The transceivers may be switched. Transceiver 1010 may be coupled to processor 1002 via a Peripheral Component Interconnect-Express (PCI-E) bus, and/or via a daughtercard. As transceiver 1012 is for providing LTE UE functionality, in effect emulating a user equipment, it may be connected via the same or different PCI-E bus, or by a USB bus, and may also be coupled to SIM card 1018.

SIM card 1018 may provide information required for authenticating the simulated UE to the evolved packet core (EPC). When no access to an operator EPC is available, local EPC 1020 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1010 and 1012, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1002 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1010 and 1012. Baseband processor 1006 may use memory 1008 to perform these tasks.

Additional Embodiments and Alternatives

Regarding what's the maximum # of virtual instances which can be created by one physical CWS, there are a couple of limiting factors in some embodiments and under some assumptions: Given that each virtual instance needs to consume at least 6 PRBs (to publish its own PCI), the number of virtual instances will be limited to division of 6—for example: 20 MHz equals to 100 PRBs→16 instances; 10 MHz equals to 50 PRBs→8 virtual instances etc. Meanwhile, as described herein regarding the location of the reference signal (RS), in order to maintain no-collision for the RS position, virtual cells and the original physical cell have to maintain mod-6 difference. Given this, one physical CWS can populate up to 5 virtual instances, in some embodiments.

Modifications to the PHY layer of the base station may be required to, for example: correctly produce an output signal containing reference signals from both a cell and a virtual cell. Signal strength of the virtual cell may be determined at the UE without significant modifications to the UE because the UE will receive signals from each of the physical eNBs that make up the virtual cell and, since the received signals are all using the same VCI/reference signal, the UE will correctly assess the RSSI of the VCI based on whatever received signal is strongest (typically from the closest physical eNB).

In the present disclosure, the words "NodeB" or "eNodeB" are used to refer to a cellular base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), 5G, as well as any equivalents, and a virtual cell could be created for these other RATs using the same general approach described herein for 4G.

While the present disclosure uses the term "cell," this term is used merely to illustrate the concepts herein, and nothing is implied regarding size, power level etc. for any cells that could be used with the disclosed systems and methods, i.e. "cell" may be interpreted as including macro cells, femto cells, multi-radio access technology (RAT) access nodes, indoor cells, outdoor cells, etc.

Various alternative embodiments are also contemplated by the inventors. For example, certain functions may be performed at a multi-radio access technology node (multi-RAT) node, instead of at a base station management gateway, for example when a base station takes on a management role in a network, or for example when base stations are joined in a mesh network and one or more base stations takes a management role. The base station management gateway may substantially take the form of the described Parallel Wireless HetNet Gateway. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

The protocols described herein may be optimized for greater or lesser latency, for more or fewer mesh nodes, for more or fewer data streams, and other alternatives. In some embodiments, these optimizations may be performed at the eNodeB, at the base station management gateway, within a function performing radio resource allocation and coding selection, or at another location. In some embodiments, a base station management gateway may identify and initiate power adjustments to improve channel quality.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as 5G, LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method for combining two radio access network (RAN) cells into a virtual cell, comprising: at a coordinating node, assigning a virtual cell identifier (VCID) for the virtual cell, the VCID assigned to a cell edge User Equipment (UE) and delineating a cluster of Up Load (UL) and Down Load (DL) cells;

assigning a plurality of base stations to the virtual cell;

scheduling, using a hybrid scheduling scheme wherein a pool of Resource Blocks (RBs) are reserved for cell edge UEs and are also scheduled by a HetNet Gateway (HNG) as central sources, the central sources including resource block allocations for a physical downlink shared channel (PDSCH), a physical uplink shared channel (PUSCH), a physical uplink control channel (PUCCH), and a physical downlink control channel (PDCCH);

assigning a single set of radio resources to two different UEs that are being served by the virtual cell, each UE being served by a different one of the two RAN cells, such that the single set of radio resources is reused across the two RAN cells;

at a base station of the plurality of base stations, constructing a signal containing two cell identifiers, the two cell identifiers being the virtual cell identifier and a physical cell identifier of the base station, and sending the signal to the cell edge UE;

thereby improving performance for the UE at a cell edge of a first base station of the plurality of base stations and of a second base station of the plurality of base stations; and using spatial diversity or beamforming for spatial multiplexing between the plurality of base stations and the cell edge UE to provide spectrum gain and reduce interference, wherein the signal includes a reference signal, a primary synchronization signal, and a secondary synchronization signal for the UE; and constructing the virtual cell identifier not to overlap with the physical cell identifier of the base station, such that the reference signal maintains a mod-6 difference.

2. The method of claim 1, further comprising at a second base station of the plurality of base stations, constructing a second signal containing two cell identifiers, the two cell identifiers being the virtual cell identifier and a physical cell identifier of the second base station, and sending the second signal to the cell edge UE.

3. The method of claim 1, wherein the coordinating node is a mesh network base station or a gateway between the plurality of base stations and a core network.

4. The method of claim 1, wherein the UE is a cell edge UE having a reduced signal quality below a cell edge threshold.

5. The method of claim 1, wherein the plurality of base stations are LTE eNodeBs.

6. The method of claim 1, further comprising constructing the signal with up to five cell identifiers.

7. The method of claim 1, further comprising reserving, at the coordinating node, a portion of a radio resource pool for cell edge users.

8. The method of claim 1, further comprising scheduling, at the base station, resources for a cell center UE.

9. The method of claim 1, further comprising assigning non-overlapping radio resources to different UEs.

10. The method of claim 1, further comprising sending data from more than one of the plurality of base stations in the virtual cell simultaneously to the UE.

11. The method of claim 1, further comprising using interference rejection combining (IRC) or maximum ratio combining (MRC) to construct or reconstruct the signal.

12. The method of claim 1, further comprising using modulated symbol multiplexing at a transmitter or modulated symbol de-multiplexing at a receiver.

13. The method of claim 1, further comprising performing management of member transmitters at different base stations as virtual MIMO antennas.

14. The method of claim 1, further comprising assigning two physical base stations to the virtual cell, to communicate with a Cat. 4 UE, or assigning four physical base stations in the virtual cell, to communicate with a Cat. 6 or Cat 7 UE.

15. The method of claim 1 further comprising acting, by the virtual cell, as a single cell without causing an underlying physical non-virtual cell to fail to act as their own cell.

\* \* \* \* \*